United States Patent
Gontarek et al.

(10) Patent No.: US 7,381,075 B2
(45) Date of Patent: Jun. 3, 2008

(54) RIGID STRUCTURE WITH A LATCH MECHANISM FOR FASTENING A HANDHELD DEVICE THERETO

(75) Inventors: Amy L. Gontarek, Rochester, NY (US); William Wheatley, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/503,643

(22) Filed: Aug. 14, 2006

(65) Prior Publication Data

US 2008/0038954 A1 Feb. 14, 2008

(51) Int. Cl.
*H01R 4/50* (2006.01)

(52) U.S. Cl. .................. 439/341; 361/686; 361/725; 439/929

(58) Field of Classification Search ............... 439/341, 439/372, 155, 929; 361/726, 752, 759, 725, 361/686
See application file for complete search history.

(56) References Cited

U.S. PATENT DOCUMENTS

| | | | |
|---|---|---|---|
| 3,993,278 A | 11/1976 | Race | |
| 4,472,606 A | 9/1984 | Krolopp et al. | |
| 5,305,180 A * | 4/1994 | Mitchell et al. | 361/685 |
| 5,320,311 A | 6/1994 | Jensen et al. | |
| 5,438,685 A | 8/1995 | Sorensen et al. | |
| 5,627,727 A * | 5/1997 | Aguilera et al. | 361/686 |
| 5,825,616 A * | 10/1998 | Howell et al. | 361/684 |
| 5,964,601 A * | 10/1999 | Tsurumaru et al. | 439/141 |
| 6,042,414 A * | 3/2000 | Kunert | 439/374 |
| 6,643,139 B2 * | 11/2003 | Tien | 361/727 |
| 6,749,960 B2 * | 6/2004 | Takeshita et al. | 429/123 |

* cited by examiner

*Primary Examiner*—Michael C Zarroli
(74) *Attorney, Agent, or Firm*—Darby & Darby; Robert J. Sacco

(57) ABSTRACT

A cradle is provided for a handheld communications device (106). The cradle is comprised of a rigid structure (160), a latch actuator (302), a latch (300), an engagement face (514), and a resilient member (304, 304-1, 304-2). The rigid structure defines a compartment (202) for receiving the device. The compartment is comprised of an aperture and a sidewall structure (314). The latch actuator is comprised of a first end portion (716) and a second end portion (720). The latch actuator is movable in a sliding motion aligned with the sidewall between a first position and a second position. The latch is pivotally mounted to the first end portion of the latch actuator. The resilient member resiliently biases the latch actuator in a first position. The latch actuator is engaged when the device is inserted into the compartment and pushed down such that a force is applied to the latch actuator causing the latch to be moved to a second position where it engages the device.

22 Claims, 7 Drawing Sheets

RIGID STRUCTURE WITH A LATCH MECHANISM FOR FASTENING A HANDHELD DEVICE THERETO

BACKGROUND OF THE INVENTION

1. Statement of the Technical Field

The invention concerns latch mechanisms, and more particularly, latch mechanisms for fastening a handheld communications device to a vehicular mounting system.

2. Description of the Related Art

There are many latch mechanisms known in the art for fastening a handheld communications device (such as a radio) to a vehicular mounting system. Such latch mechanisms allow the handheld communications device to be stored for ready use in the vehicular mounting system. The latch mechanisms typically allow the handheld communications device to be quickly and easily inserted into the vehicular mounting system and secured therein for later use.

However, such latch mechanisms typically suffer from certain drawbacks. For example, latch mechanisms are often provided with numerous parts, a complicated assembly feature, and a large physical size characteristic. As such, there remains a need for a latch mechanism that provides users with a compact, cost effective mechanism that can be easily assembled.

It should be appreciated that a handheld communications device may be inserted and removed from a vehicular mounting system many times throughout a day. In this regard, the latch mechanism needs to provide users with easy and reliable insertion and removal features. It should also be appreciated that a handheld communications device can be damaged by external forces. For example, a vibration force is caused by driving a vehicle over a rough terrain. Such a vibration force can damage a handheld communications device. Therefore, the latch mechanism needs to optimize an interface between the handheld communications device and the vehicular mounting system such that a communications device will not be damaged by an external force.

SUMMARY OF THE INVENTION

The invention concerns a cradle for a handheld communications device. The cradle is comprised of a rigid structure, a latch actuator, a latch, an engagement face, and a resilient member. The rigid structure defines a compartment for receiving a portion of the handheld communications device. The compartment is comprised of an aperture (i.e., an opening) that is sized and shaped for receiving the handheld communications device. The compartment is also comprised of one or more sidewall structures extending from the aperture. The compartment contains a base structure that is disposed within the compartment at a first location that is opposed from the aperture.

The latch actuator has an elongated shape with a first end portion and a second end portion. The second end portion is opposed from the first end portion. The latch actuator moves in a sliding motion aligned with the sidewall between a first position and a second position. A resilient member is provided for resiliently biasing the latch actuator in its first position.

The latch is pivotally mounted to the first end portion of the latch actuator and to the rigid structure. The latch is positioned at the aperture of the compartment. The latch is biased into a first latch position when the latch actuator is in its first position. The engagement face is disposed on the second end portion of the latch actuator. The engagement face extends into the compartment when the latch actuator is in its first position.

According to an aspect of the invention, the latch is actuated when the handheld communications device is inserted into the compartment. In effect, the handheld communications device applies a force to the engagement face causing the latch actuator to move to its second position and the latch to move to a second latch position. In this second latch position, the latch engages the handheld communications device thereby securing the handheld communications device within the cradle.

According to another aspect of the invention, the cradle is comprised of a locking mechanism. The locking mechanism includes a first locking structure provided on the latch actuator. The locking mechanism also includes a second locking structure attached to the rigid structure. The second locking structure automatically lockingly engages the first locking structure when the latch actuator is moved to its second position.

According to another aspect of the invention, the first locking structure is an aperture formed in a portion of the latch actuator. The second locking structure is a pin that is resiliently biased toward the aperture. The pin is comprised of a knob that is external to the rigid structure. A pulling action on the knob disengages the locking mechanism. In this regard, it should be appreciated that the latch actuator is resiliently urged toward its first position when the second locking structure is disengaged from the first locking structure. Consequently, the engagement face projects into the compartment thereby partially ejecting the handheld communications device from the compartment.

According to yet another aspect of the invention, the guide is comprised of a channel defined within the rigid structure. As such, the latch actuator moves within the channel from its first position to its second position.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
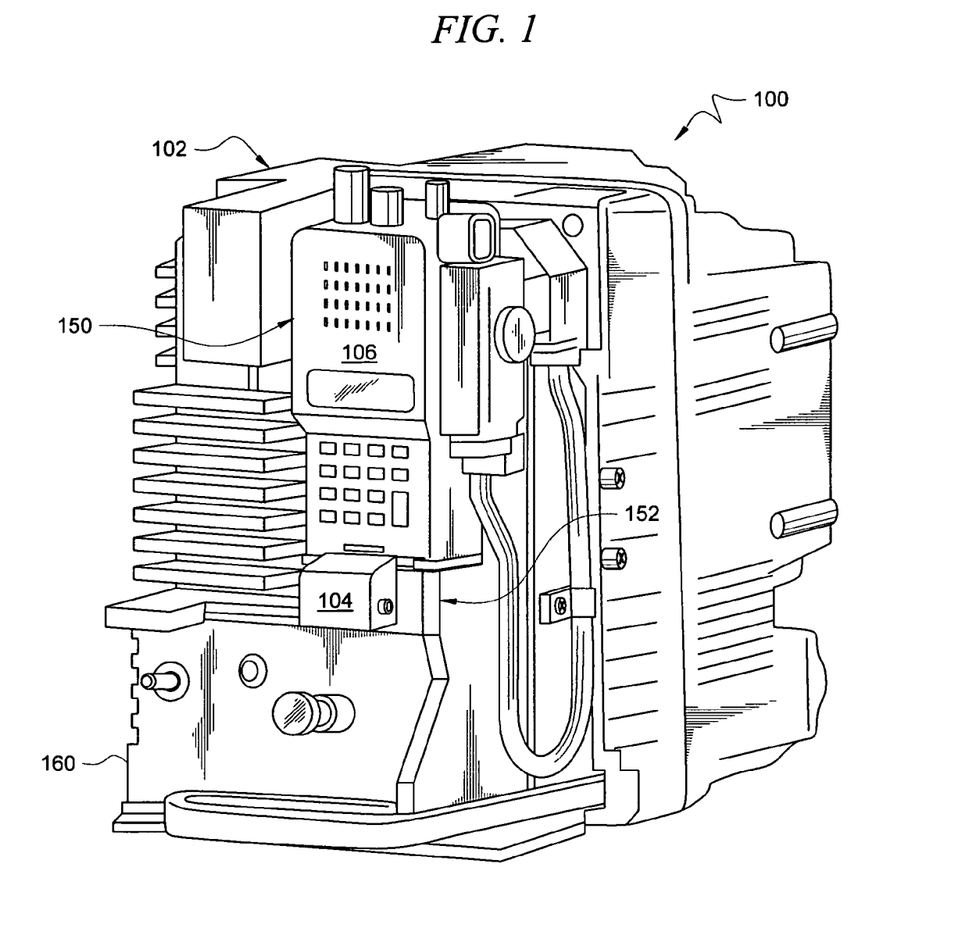
FIG. 1 is a perspective view of a vehicular communications system including a latch mechanism that is useful for understanding the invention.

FIG. 1 is a schematic illustration of a vehicular communications system 100 that is useful for understanding the invention. The vehicular communications system (VCS) 100 is comprised of a vehicular mounting system (VMS) 102, which includes a cradle for securely positioning a handheld communications device (HCD) 106 within the VMS 102. The VMS 102 can be any system known in the art, such as a mounting chassis, an amplifier system, and/or a battery charging system.

The HCD 106 is comprised of a handheld radio, a handheld telephone, and/or any other handheld communications device. The HCD 106 is comprised of an upper portion 150 and a lower portion 152. As shown in FIG. 1, at least the lower portion 152 is inserted into a compartment 202 (described below in relation to FIG. 2 through FIG. 3) formed within a base portion 160 of the VMS 102. The architecture of the HCD 106 can be selected in accordance with a particular VCS 100 application.

The VMS 102 is comprised of a latch mechanism 104 that is integrated into the base portion 160 of the VMS 102 and is partially shown in FIG. 1. The latch mechanism 104 provides a system for securely fastening the HCD 106 to the VMS 102 such that the HCD 106 will not be dislodged from the VMS 102. The latch mechanism 104 will be described in greater detail below in relation to FIG. 3 through FIG. 7.

Figure 2:
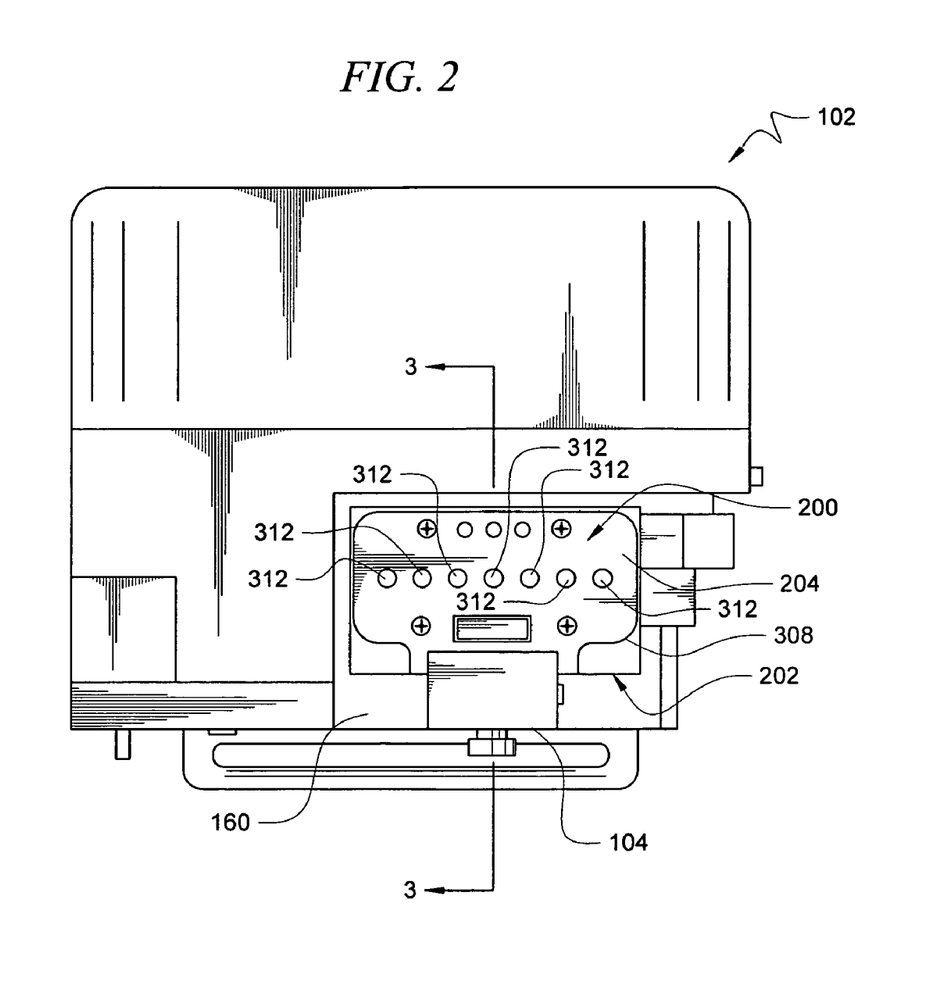
FIG. 2 is a top view of a vehicular mounting system shown in FIG. 1 that is useful for understanding the invention.

Referring now to FIG. 2, there is provided a top view of the VMS 102 shown in FIG. 1 that is useful for understanding the invention. However, it should be understood that the HCD 106 has been removed from the VMS 102. As shown in FIG. 2, the VMS 102 is comprised of a cradle for the HCD 106. The cradle is defined by the base portion 160 which is a rigid structure that is sized and shaped for receiving the HCD. The base portion 160 positions the latch mechanism 104 and generally defines a compartment 202. The compartment 202 has an insert space 200 that is sized and shaped for receiving at least a portion of the HCD 106. The compartment 202 is comprised of a base structure 308 disposed therein. The base structure 308 has a surface 204 for supporting a base of the HCD 106 when at least a portion of the HCD 106 is positioned within the compartment 202.

In FIGS. 1 and 2, the compartment 202 is shown to be closed on each side except for an aperture (i.e. an opening) provided for insertion of HCD 106. However, it should be understood that the invention is not limited in this regard. Rather than being generally closed, compartment 202 can alternatively be comprised of a rigid structure comprising an open framework. All that is necessary is that the compartment provides a rigid structure suitable for accommodating the function of the latching mechanism as hereinafter described in greater detail.

Figure 3:
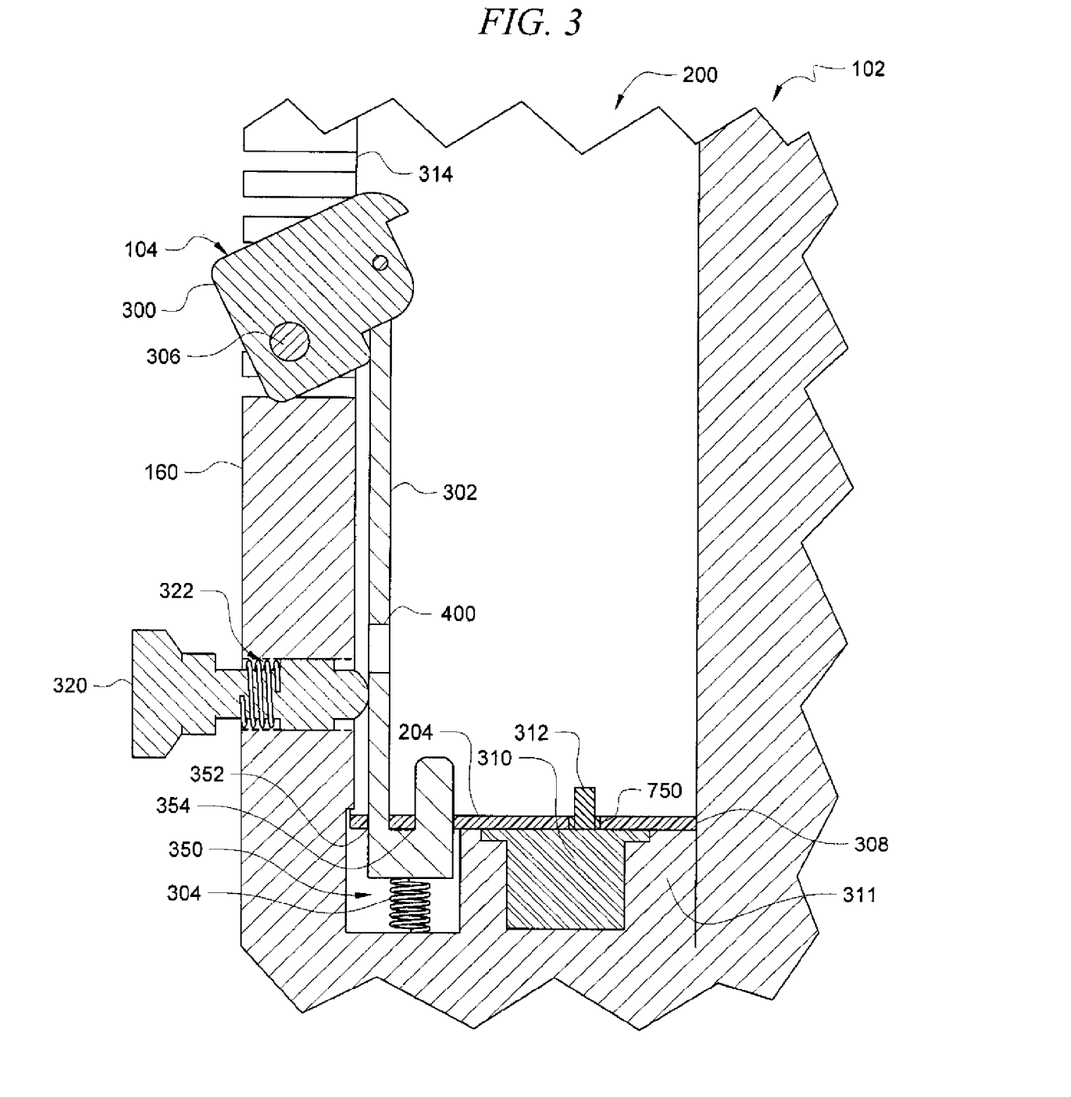
FIG. 3 is a cross-sectional view of a vehicular mounting system taken along the line 3-3 of FIG. 2.

Referring now to FIG. 3, there is provided a cross-sectional view of the VMS 102 taken along the line 3-3 of FIG. 2. As shown in FIG. 3, the latch mechanism 104 is comprised of a latch 300, a latch actuator 302, at least one resilient member 304, a latch pin 306, and a base structure 308. Each of the listed components are described in greater detail below in relation to FIG. 6 and FIG. 7. However, a brief discussion of how the latch mechanism 104 is coupled to the VMS 102 is provided to assist a reader in understanding the present invention.

Referring again to FIG. 3, the latch mechanism 104 is further comprised of a locking mechanism. The locking mechanism includes a first locking structure and a second locking structure which are configured for locking engagement when the latch actuator 302 is in a certain position. According to one aspect of the invention, the first locking structure is a pin 320 that is movably attached to the base portion 160 of the VMS 102. In this regard, the base portion 160 is comprised of a bore 322 for receiving the pin 320. The bore 322 is sized and shaped for allowing the pin 320 to pass through the rigid structure comprising the base portion 160. It should be appreciated that the pin 320 and the bore 322 can be threaded such that the pin 320 can be screwed into the rigid structure. The second locking structure in that case will include a recess or an aperture 400 formed in the latch actuator 302.

The latch 300 is coupled to the VMS 102 with the latch pin 306. According to an embodiment of the invention, the latch pin 306 is pivotally mounted to the VMS 102 such that it rotates when the latch mechanism 104 is actuated. Still, the invention is not limited in this regard. For example, the latch pin 306 can alternatively be coupled to the VMS 102 such that it simply provides a pivot point for the latch 300. A person skilled in the art will appreciate that the VMS 102 can be machined to include a bore (not shown) that is sized and shaped for receiving the latch pin 306.

The latch actuator 302 is mounted within the VMS 102 in a manner which accommodates a sliding motion of the latch actuator 302 in a direction that is generally transverse to surface 204 of the base structure 308 and aligned with at least one sidewall structure 314 of the base portion 160. For example, at least one guide structure can be provided within or adjacent to the compartment 202 for this purpose. The guide structure can include any suitable arrangement such as a slot, a channel, or a rail that is capable of guiding a sliding motion of the latch actuator in a direction that is generally transverse to the surface 204 and aligned with at least one sidewall structure 314. In the embodiment shown, the base structure 308 defines channels 352, 354 for receiving the latch actuator 302. When the latch mechanism 104 is actuated, the channels 352, 354 help guide the latch actuator 302 along a path that is generally transverse to the surface 204 of the base structure 308 and aligned with the at least one sidewall structure 314. In this regard, it will be understood that the channels 352, 354 permit a sliding motion of the latch actuator 302 so that the latch actuator 302 moves between a first position, shown in FIGS. 3 and 4, and a second position shown in FIG. 5. A recess 350 can be provided to accommodate the sliding motion of the actuator 302.

It should be understood that the base structure 308 is generally coupled to a rigid structure 311 formed within the base portion 160 using any means known in the art, such as a rivet, a screw, or an adhesive. The foregoing arrangement retains the base structure 308 in a desired position within the compartment 202. This arrangement also provides a system for aligning the latch mechanism 104 with one or more sidewall structures 314 of the base portion 160. The one or more sidewall structures 314 can be a sidewall of an open framework or a sidewall of a closed structure.

As shown in FIG. 3, an electronics module 310 can be provided below the base structure 308 within the base portion 160. The electronics module 310 is comprised of one or more electrical contacts 312 for electrically coupling the VMS 102 and the HCD 106 (described above in relation to FIG. 1). Consequently, the base structure 308 includes at least one bore 750 sized and shaped for allowing the contacts 312 to pass into the compartment 202.

It should be appreciated that the one or more electrical contacts 312 can be designed in accordance with a particular electronics module 310 application. For example, the electrical contacts 312 can be rigid contacts (as shown) or resilient contacts (such as spring contacts). A person skilled in the art will appreciate that a resilient contact is advantageous where an HCD 106 is comprised of a flat bottom surface. In such a scenario, the resilient contact is sized and shaped for compression when the HCD 106 is inserted into the compartment and applies a downward force thereto.

As noted above, the compartment 202 defines an insert space 200 configured for receipt of the HCD 106. For example, the compartment 202 defines a length, a width, and a depth that somewhat exceeds the corresponding dimensions of the portion of the HCD 106 intended for insertion in the compartment 202.

Figure 4:
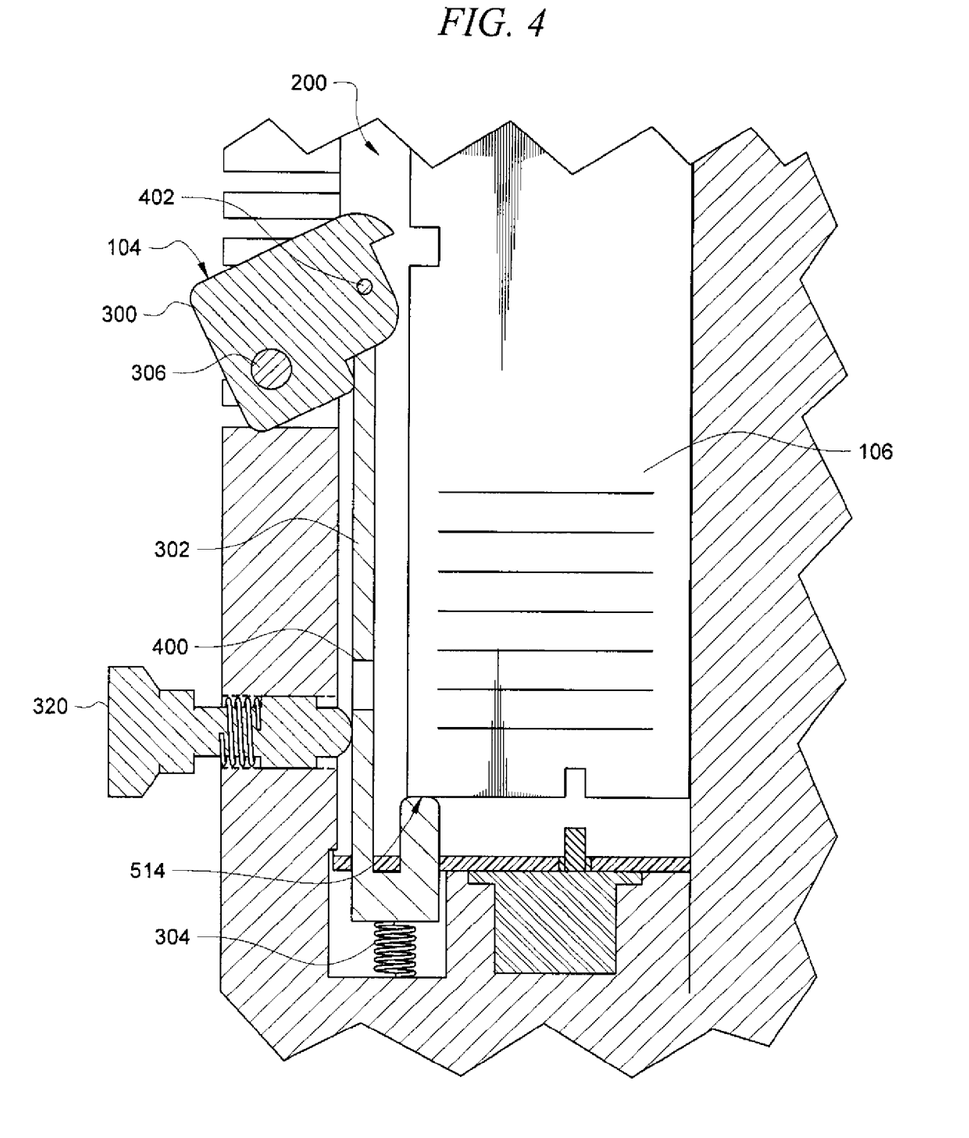
FIG. 4 through FIG. 5 collectively illustrate a latch mechanism engagement that is useful for understanding the invention.

The invention will now be described in relation to FIG. 4 and FIG. 5 which show an operation of the latch mechanism 104. In FIG. 4, the latch mechanism 104 is in its fully disengaged state. In this state, the latch 300 is in its first position (also herein referred to as a first latch position) such that the HCD 106 can be freely moved into and out of the compartment 202. Also in this state, the pin 320 is in its first position where it is fully disengaged from an aperture 400 formed in the latch actuator 302. The one or more resilient member(s) 304 (for example, a spring) is also in its first position. In this regard, it should be understood that the resilient member 304 provides a system for resiliently biasing the latch actuator 302 upward to its first position as shown in FIG. 4. According to an embodiment of the invention, the resilient member 304 can be advantageously selected to have a sufficient spring force so as to urge the latch actuator 302 to its first position shown in FIG. 4, even when the weight of HCD 106 is resting on an engagement face 514 that extends into the compartment 202.

Figure 5:
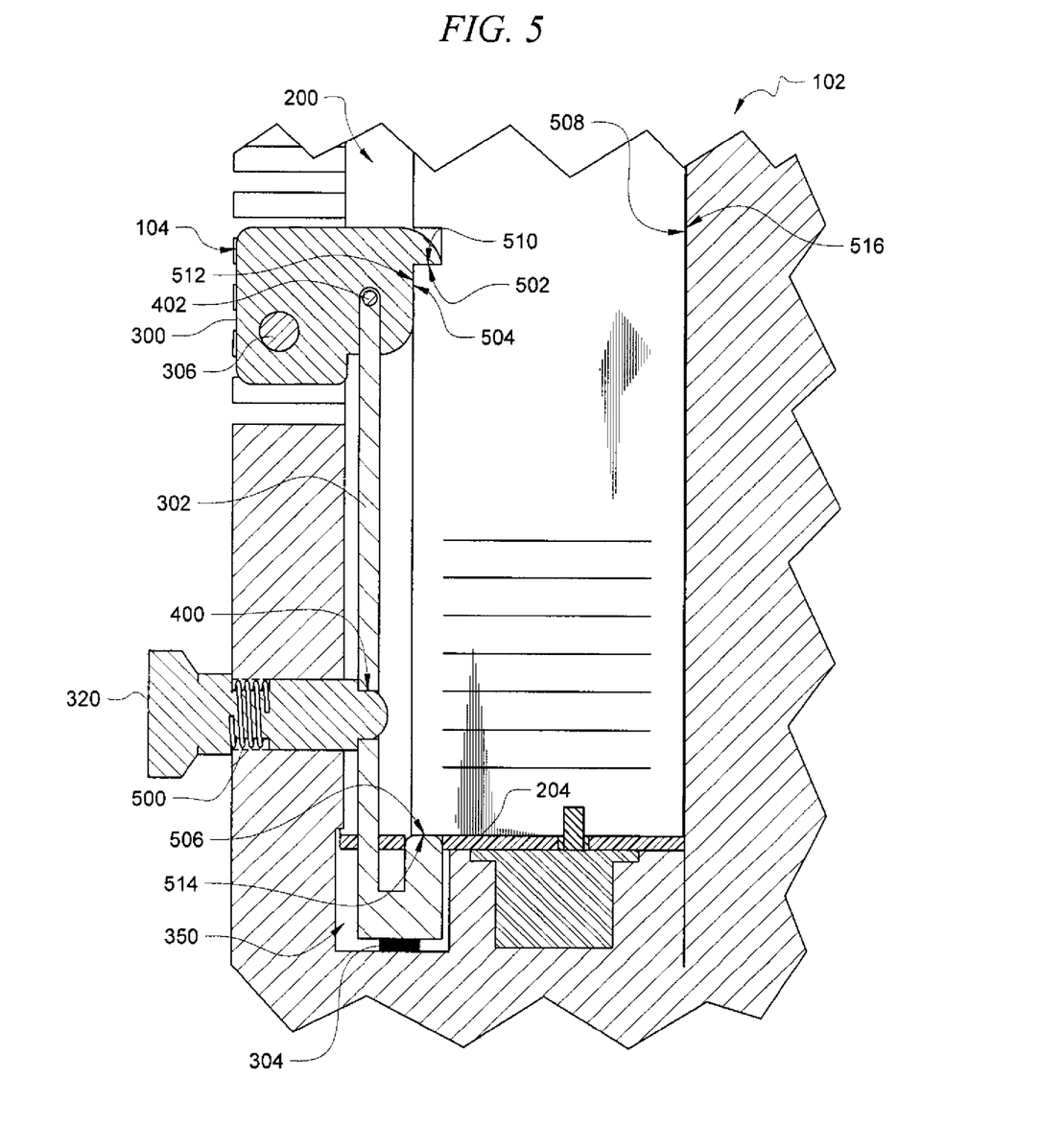

In FIG. 3 through FIG. 5, the engagement face 514 is shown as an integral part of the latch actuator 302. However, it should be understood that the invention is not limited in this regard. The engagement face 514 can be part of a separate structural element that is coupled directly or indirectly to the latch actuator 302. All that is necessary is that the engagement face 514 be coupled to the latch actuator 302 in such a way that a downward force applied to the engagement face 514 by the HCD 106 will cause a similar downward force to also be applied to the latch actuator 302.

It should be appreciated that the latch mechanism 104 will be engaged when a user applies a sufficient downward force to the HCD 106 so as to overcome the force of the resilient member 304. As the user applies the downward force to the HCD 106, the HCD 106 applies a downward force to the engagement face 514. The engagement face 514 transfers this force to the latch actuator 302. This motion of the latch actuator 302 exerts a pulling force on the latch 300 at mechanical connector 402, thereby causing the latch 300 to rotate about a latch pin 306 in a clockwise direction. This rotation continues until the latch actuator 302 and the latch 300 reach their second positions (shown in FIG. 5). The sliding motion of the latch actuator 302 will also result in an alignment of aperture 400 with the pin 302, thereby allowing the pin to move into a locked position where it is inserted within the aperture 400.

Referring now to FIG. 5, the latch mechanism 104 is shown fully engaging the HCD 106. In FIG. 5, the HCD 106 is inserted into the compartment 202 to its maximum extent. In this fully engaged state, the at least one resilient member 304 is fully compressed by the movement of the latch actuator 302 within the recess 350. The pin 320 is also in its second position where it is fully inserted into an aperture 400 provided on the latch actuator 302. In this regard, it should be appreciated that the pin 320 and the aperture 400 collectively provide a mechanical locking mechanism for securing the latch mechanism 104 is in its fully engaged state.

It should also be appreciated that the pin 320 is advantageously comprised of a resilient member 500 (for example, a spring) for automatically lockingly engaging the pin 320 with the aperture 400 when the latch actuator 302 is moved into its second position. Still, the invention is not limited in this regard. For example, the pin 320 can be absent of the resilient member 500 such that the pin 320 manually lockingly engages the aperture 400.

As shown in FIG. 5, the HCD 106 is secured to the VMS 102 through an application of a vertical clamping force to the HCD 106. In this regard, the latch 300 applies a vertical force to the HCD 106 such that surface 502 of the HCD 106 abuts surface 510 of the latch 300. Similarly, a surface 506 abuts engagement face 514 and surface 204. Still, the invention is not limited in this regard. For example, the latch 300 can also be designed to apply a horizontal force to the HCD 106 such that a surface 512 of the latch 300 abuts a surface 504 of the HCD 106 and a surface 508 of the HCD 106 abuts a surface 516 of the VMS 102.

A person skilled in the art will appreciate that the pin 320 and the at least one resilient member 304 can provide a system for returning the latch mechanism 104 to its fully disengaged state (shown in FIG. 4). For example, if the pin 320 is manually pulled out of the aperture 400, it will disengage the locking mechanism 104. As such, the at least one resilient member 304 returns to its first position, urging the latch actuator 302 towards its first position. In this regard, it should be appreciated that the upward force applied to the latch actuator 302 by the at least one resilient member 304 is advantageously selected so that it is greater than the downward force applied to the engagement face 514 by the weight of the HCD 106. Consequently, the engagement face 514 will be urged upwardly so that it projects into the compartment 202 (i.e., the compartment 202 described above in relation to FIG. 2). The latch 300 rotates counterclockwise in response to the movement of the latch actuator 302 returning towards its first position. In this regard, the latch 300 rotates counterclockwise about the mechanical connector 402 until it reaches its first latch position. When the latch 300 and the latch actuator 302 reach their first positions, the HCD 106 is partially ejected from the compartment 202 such that it can be removed from the VMS 102.

It should be appreciated that the latch mechanism 104 remains in its fully disengaged state (shown in FIG. 4) when the latch mechanism 104 is not in use. Also, the action of the pin 320 snapping into position in the aperture 400 advantageously produces an audible noise upon its engagement and/or disengagement, confirming the operation of the latch mechanism 104. The latch mechanism 104 is designed to survive harsh military environments and to have an easy assembly feature. It should also be appreciated that the latch mechanism 104 provides a clamping system having an optimized interface between the HCD 106 and the VMS 102 such that the HCD 106 will not be damaged by an external force. In this regard, it should be appreciated that the latch mechanism 104 provides a system for adequately fastening the HCD 106 to the VMS 102 to prevent loosening of the HCD 106 due to vibration forces. The latch mechanism 104 also provides a system for a single hand insertion and removal of the HCD 106 from the VMS 102.

Figure 6:
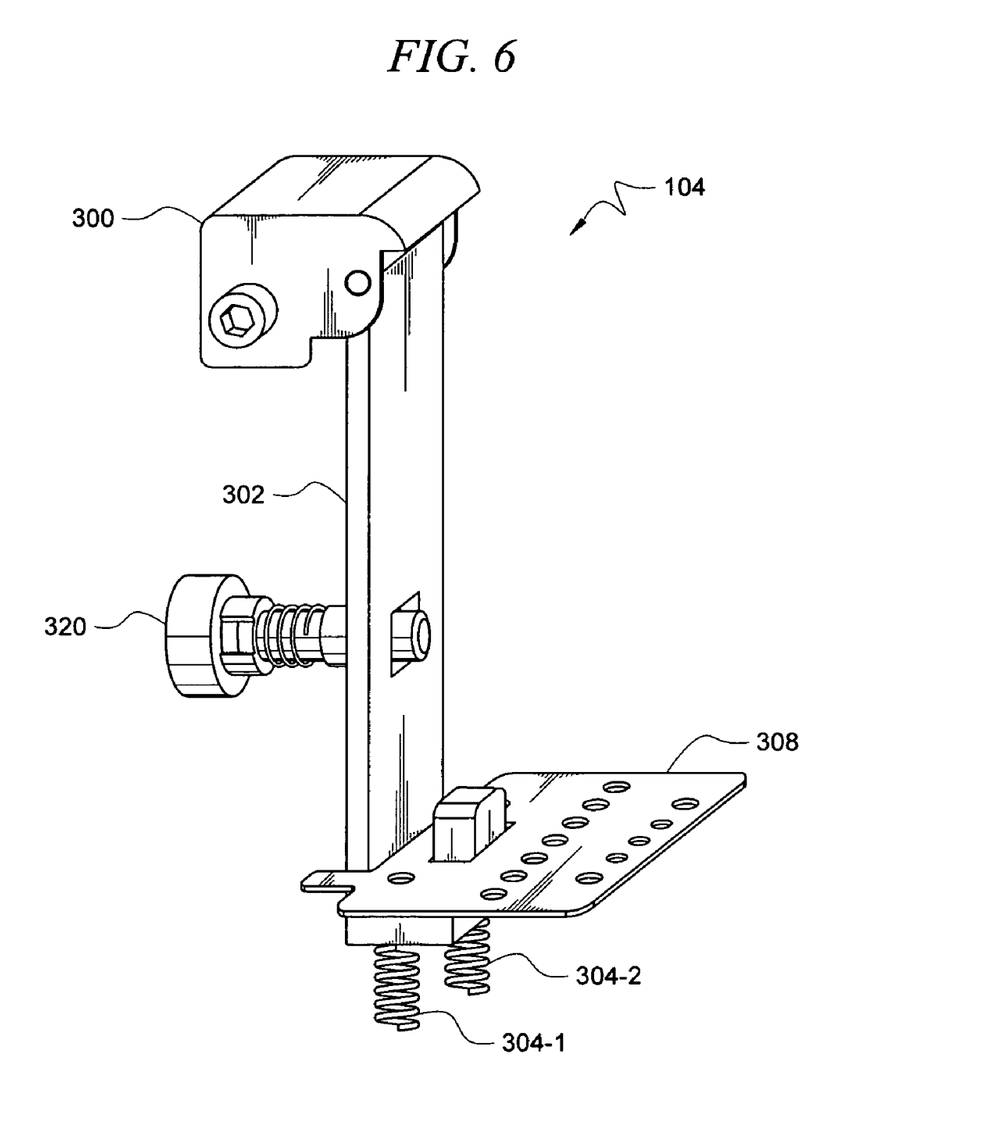
FIG. 6 is a perspective view of the latch mechanism of FIG. 3 through FIG. 5 that is useful in understanding the invention.
Figure 7:
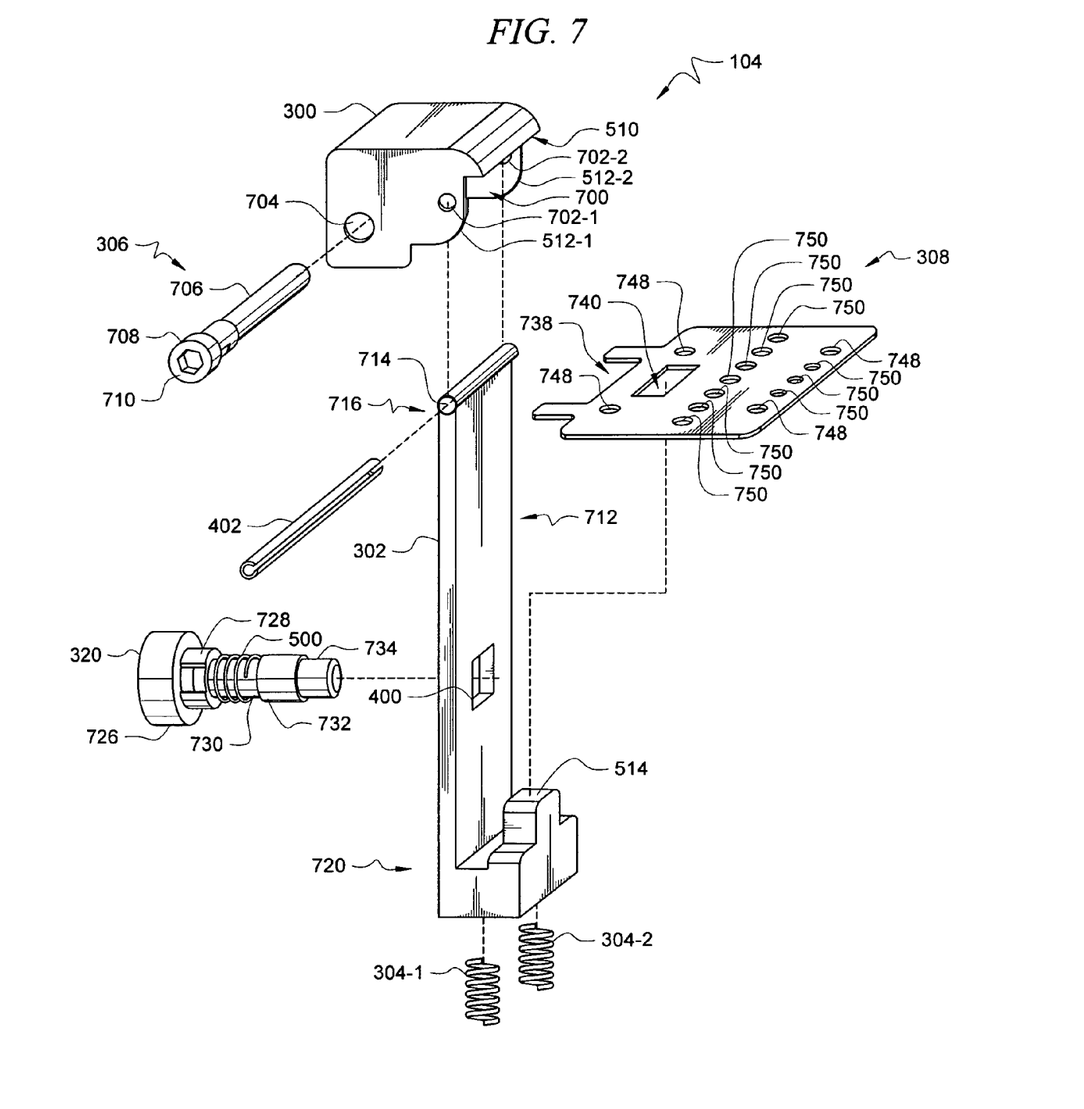
FIG. 7 is an exploded perspective view of the latch mechanism of FIG. 6.

A more detailed discussion of the latch mechanism 104 will now follow. Referring to FIG. 6, there is provided a perspective view of the latch mechanism 104 that is useful for understanding the invention. An exploded perspective view of the latch mechanism 104 is provided in FIG. 7. As shown in FIG. 6 and FIG. 7, the latch mechanism 104 is comprised of a latch 300, a latch actuator 302, resilient members 304-1, 304-2, a pin 320, and a base structure 308. Each of the listed components can be comprised of any material commonly used in the art, such as a metal, a metal alloy, a composite material, or a rigid polymer.

Referring to FIG. 7, the latch 300 is comprised of a space 700 size and shaped for receiving the latch actuator 302. The latch 300 is pivotally mounted to the latch actuator 302 using a mechanical connector 402. In this regard, the latch 300 is comprised of bores 702-1, 702-2 sized and shaped for allowing the mechanical connector 402 to pass through the latch 300. Similarly, the latch actuator 302 is comprised of a bore 714 sized and shaped for allowing the mechanical connector 402 to pass through the latch actuator 302. In turn, the mechanical connector 402 is designed in accordance with a latch mechanism 104 application (for example, the mechanical connector 402 can be a spring pin sized and shaped for insertion into each bore 702-1, 702-2, 714 or the mechanical connector 402 can be a pin having a diameter less than a diameter of each bore 702-1, 702-2, 714).

According to an embodiment of the invention, the mechanical connector 402 is a spring pin. Spring pins are well known to persons skilled in the art. Thus, spring pins will not be described in great detail herein. However, it should be appreciated that the invention is not limited in this regard. The mechanical connector 402 can be selected as any means commonly used in the art, such as a rivet, a screw, or a pin.

Referring again to FIG. 7, the latch 300 is also comprised of at least one bore 704 sized and shaped for allowing the latch pin 306 to pass through the latch 300. For example, the latch pin 306 is designed for partial insertion into the at least one bore 704. As such, the latch pin 306 is comprised of a body member 706 having a diameter that is less than the diameter of the at least one bore 704. It should be appreciated that the body member 706 can be threaded. In such a scenario, the at least one bore 704 can also be threaded for engagement with the body member 706.

The latch pin 306 is also comprised of a head member 708. The diameter of the head member 708 is greater than the diameter of the at least one bore 704 such that the latch pin 306 will only be partially inserted into the bore 704. As shown in FIG. 7, the head member 708 is comprised of a hex drive design 710. Still, the invention is not limited in this regard. The head member 708 can be comprised of any drive design known in the art, such as a slotted drive design, a Phillips drive design, a Pozidriv drive design, a Torx drive design, and a Robertson drive design.

As shown in FIG. 7, the latch 300 is comprised of a flat, elongated clamping surface 510 configured to engage a rigid surface 502 of the HCD 106 (described above in relation to FIG. 5) when an adequate amount of force is applied to the latch actuator 302. In this regard, the latch 300 exerts a vertical clamping force against the HCD 106. Still, the invention is not limited in this regard. For example, the latch 300 can be further comprised of flat, elongated clamping surfaces 512-1, 512-2 that are configured to engage a rigid surface 504 of the HCD 106 (described above in relation to FIG. 5). As such, the latch 300 can exert a horizontal clamping force against the HCD 106 when an adequate amount of force is applied to the latch actuator 302.

It should be appreciated that the latch 300 architecture shown in FIG. 7 is one embodiment of a latch architecture. The invention is not limited in this regard and any other latch architecture can be used without limitation provided that it is configured to exert a vertical and/or a horizontal clamping force against the HCD 106. For example, the latch 300 can be comprised of a gripping portion. In this regard, the latch 300 can be machined to include the gripping portion. Alternatively, the gripping portion can be coupled to the latch 300 by any attachment means commonly used in the art, such as a rivet or an adhesive.

Referring again to FIG. 7, the latch actuator 302 is comprised of an elongated shape having a first end portion 716, a body member 712, and a second end portion 720. The first end portion 716 is comprised of a bore 714. The first end portion 716 is designed for insertion into the space 700 of the latch 300. The body member 712 is comprised of an aperture 400 for receiving of the pin 320. The second end portion 720 is formed into a shape of a hook. It should be appreciated that the latch actuator 302 can be machined to include the second end portion 720. Alternatively, the second end portion 720 can be coupled to the latch actuator 302 by any attachment means commonly used in the art, such as a rivet, a screw, or an adhesive. It should also be appreciated that the second end portion 720 can be configured for receiving the resilient members 304-1, 304-2. For example, the second end portion 720 can be comprised of one or more apertures (not shown) having a size greater than that of the resilient members 304-1, 304-2.

As shown in FIG. 7, each resilient member 304-1, 304-2 is selected to include a compression spring having a proper spring constant to provide a force acting on the latch actuator 302. The diameters and lengths of the resilient member 304-1, 304-2 are selected in accordance with the type or size of the latch mechanism 104 desired. Still, the invention is not limited in this regard. The resilient members 304-1, 304-2 can be of any type known in the art, such as a rubber pad.

The pin 320 is comprised of a knob member 726. The knob member 726 provides a means for manually disengaging (i.e., pulling out) the pin 320 from the latch actuator 302. It should be appreciated that the pin 320 can be machined to include the knob member 726. Alternatively, the knob member 726 can be coupled to the pin 320 by any attachment means commonly used in the art, such as a rivet, a screw, or an adhesive.

As shown in FIG. 7, the pin 320 is also comprised of a first body member 728, a second body member 730, and a third body member 732. It should be appreciated that the pin 320 can be machined to include the first body member 728, the second body member 730, and the third body member 732 (i.e., the pin 320 can be machined to include a single structure comprised of each body member 728, 730, 732). Alternatively, the first body member 728, the second body member 730, and the third body member 732 can be machined as independent structures. As such, each body member 728, 730, 732 can be coupled together by any attachment means commonly used in the art, such as a rivet, a screw, or an adhesive.

The first body member 728 has a diameter that is greater than that of the bore 322 (described above in relation to FIG. 3) of the VMS 102. Such a configuration assures that the pin 320 is never more than partially inserted into the bore 322. As shown in FIG. 7, the second body member 730 has a resilient member 500 disposed thereon. The resilient member 500 provides a means for automatically urging the pin 320 toward the aperture 400 when a horizontal axis of the pin and the aperture 400 are aligned. Still, the invention is not limited in this regard. For example, the resilient member 500 can alternatively be disposed within the pin 320 (i.e., disposed within the first body member 728, the second body member 730, and/or the third body member 732).

According to the embodiment shown in FIG. 7, the third body member 732 provides a means for assuring that the resilient member 500 is retained on the second body member 730. The third body member 732 also provides a means for compressing the resilient member when the pin 320 is disengaged from the aperture 400. The third body member 732 limits the extent to which the pin 320 is inserted into the aperture 400. As shown in FIG. 7, the pin 320 is further comprised of an engagement member 734. The engagement member 734 is designed for insertion into the aperture 400.

The base structure 308 is comprised of an insert space 738 and a rectangular channel or slot 740. The insert space 738 is configured for receipt of the body member 712 of the latch actuator 302. The rectangular slot 740 is configured for receipt of the second end portion 720 of the latch actuator 302 including the engagement face 514. The base structure 308 is also comprised of bores 748 designed for receiving a rivet or other connector mechanism to mechanically couple the base structure 308 to the rigid structure (described above in relation to FIG. 3) of the VMS 102. The base structure 308 is further comprised of at least one bore 750 designed for receiving a contact 312 (described above in relation to FIG. 3).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A cradle for a handheld communication device, comprising:
   a rigid structure defining a compartment for receiving at least a portion of a handheld communication device, said compartment comprising an aperture and at least one sidewall structure extending from said aperture;
   a latch actuator comprising a first end portion and a second end portion opposed from said first end portion, and movable in a sliding motion aligned with said at least one sidewall structure between a first position and a second position;
   a latch pivotally mounted to said rigid structure and coupled to said first end portion of said latch actuator;
   an engagement face at least partially extending into said compartment when said latch actuator is in said first position, said engagement face directly or indirectly coupled to said latch actuator; and
   a resilient member resiliently biasing said latch actuator in said first position;
   wherein a force applied to said engagement face when said handheld communication device is inserted into said compartment causes said latch actuator to move said latch from a first latch position, where said latch is disengaged from said handheld communication device, to a second latch position in which said latch engages said handheld communication device.

2. The cradle according to claim 1, further comprising a locking mechanism including a first locking structure provided on said latch actuator, and a second locking structure attached to said rigid structure, said second locking structure automatically lockingly engaging said first locking structure when said latch actuator is moved to said second position.

3. The cradle according to claim 2, wherein said first locking structure is an aperture formed in a portion of said latch actuator.

4. The cradle according to claim 3, wherein said second locking structure is a pin that is resiliently biased toward said aperture.

5. The cradle according to claim 4, wherein said pin further comprises a knob external to said rigid structure, and wherein a pulling action on said knob disengages said locking mechanism.

6. The cradle according to claim 2, wherein said resilient member urges said latch actuator toward said first position when said second locking structure is disengaged from said first locking structure.

7. The cradle according to claim 6, wherein said engagement face projects into said compartment when said latch actuator returns to said first position.

8. The cradle according to claim 7, wherein said engagement face is positioned to partially eject said handheld communication device from said compartment when said latch actuator returns to said first position.

9. The cradle according to claim 1, wherein said latch is pivotally attached to said latch actuator.

10. The cradle according to claim 1, wherein said latch is positioned at said aperture of said compartment, and said aperture is sized and shaped for receiving said handheld communications device.

11. The cradle according to claim 1, wherein said latch actuator moves along a sliding path at least partially defined by a guide, and said guide is comprised of a channel defined within said rigid structure.

12. A cradle for a handheld communications device, comprising:
    a rigid structure defining a compartment for receiving at least a portion of a handheld communications device, said compartment containing a base structure disposed at a first location within said compartment opposed from an aperture and at least one sidewall structure extending between said base structure and said aperture;
    a latch actuator having an elongated shape comprising a first end portion and a second end portion opposed from said first end portion, said latch actuator movable within said rigid structure on a path aligned with said at least one sidewall structure and defined by a guide configured for permitting a sliding motion of said latch actuator between a first position and a second position;
    a latch pivotally mounted to said first end portion of said latch actuator, and an engagement face disposed on said second end portion of said latch actuator, said latch biased into a first latch position and said engagement face extending into said compartment when said latch actuator is in said first position; and
    a resilient member resiliently biasing said latch actuator in said first position;
    wherein a force applied to said engagement face when said handheld communication device is inserted into said compartment causes said latch actuator to move to said second position and said latch to move to a second latch position in which said latch engages said handheld communication device.

13. The cradle according to claim 12, further comprising a locking mechanism including a first locking structure provided on said latch actuator, and a second locking structure attached to said rigid structure, said second locking structure automatically lockingly engaging said first locking structure when said latch actuator is moved to said second position.

14. The cradle according to claim 13, wherein said first locking structure is an aperture formed in a portion of said latch actuator.

15. The cradle according to claim 14, wherein said second locking structure is a pin that is resiliently biased toward said aperture.

16. The cradle according to claim 15, wherein said pin further comprises a knob external to said rigid structure and wherein a pulling action on said knob disengages said locking mechanism.

17. The cradle according to claim 13, wherein said latch actuator is resiliently urged toward said first position when said second locking structure is disengaged from said first locking structure.

18. The cradle according to claim 17, wherein said engagement face projects into said compartment when said latch actuator returns to said first position.

19. The cradle according to claim 18, wherein said engagement face is positioned to partially eject said handheld communications device from said compartment when said latch actuator returns to said first position.

20. A cradle for a handheld communication device, comprising:

a rigid structure defining a compartment for receiving at least a portion of a handheld communication device, said compartment containing a base structure, said base structure disposed at a first location within said compartment opposed from an aperture of said compartment;

a latch actuator comprising a first end portion and a second end portion opposed from said first end portion, said latch actuator movable on a path transverse to a major surface of said base structure and defined by a guide configured for permitting a sliding motion of said latch actuator between a first position and a second position;

a latch pivotally mounted to said first end portion of said latch actuator, and an engagement face disposed on said second end portion of said latch actuator, said latch biased into a first latch position and said engagement face extending into said compartment when said latch actuator is in said first position; and a resilient member resiliently biasing said latch actuator in said first position;

wherein a force applied to said engagement face when said handheld communication device is inserted into said compartment causes said latch actuator to move to said second position and said latch to move to a second latch position in which said latch engages said handheld communication device.

21. A cradle for a handheld communication device, comprising:

a rigid structure defining a compartment for receiving at least a portion of a handheld communication device, said compartment comprising an aperture sized and shaped for receiving said handheld communication device and at least one sidewall structure extending from said aperture;

a rigid latch actuator comprising an engagement face, said rigid latch actuator movable vertically within said rigid structure on a path aligned with said at least one sidewall and defined by a guide configured for permitting a sliding motion of said rigid latch actuator between a first position and a second position, said engagement face at least partially extending into said compartment when said rigid latch actuator is in said first position; and a latch pivotally mounted to said rigid structure and to said rigid latch actuator;

wherein a force applied to said engagement face when said handheld communication device is inserted into said compartment causes said rigid latch actuator to move said latch from a first latch position, where said latch is disengaged from said handheld communication device, to a second latch position in which said latch engages said handheld communication device.

22. The cradle according to claim 21, wherein said engagement face is disposed at a location within said compartment opposed from said aperture.

* * * * *